United States Patent
Howell et al.

(10) Patent No.: US 11,547,123 B2
(45) Date of Patent: Jan. 10, 2023

(54) METHODS FOR REDUCING NEGATIVE FLAVOR ATTRIBUTES IN COFFEE AND COMPOSITIONS THEREFROM

(71) Applicant: THE FOLGER COFFEE COMPANY, Orrville, OH (US)

(72) Inventors: Jessalin Anise Howell, Mason, OH (US); Yang Lu, Wadsworth, OH (US)

(73) Assignee: THE FOLGER COFFEE COMPANY, Orrville, OH (US)

( * ) Notice: Subject to any disclaimer, the term of this patent is extended or adjusted under 35 U.S.C. 154(b) by 226 days.

(21) Appl. No.: 16/989,309

(22) Filed: Aug. 10, 2020

(65) Prior Publication Data

US 2021/0045403 A1    Feb. 18, 2021

Related U.S. Application Data

(60) Provisional application No. 62/887,820, filed on Aug. 16, 2019.

(51) Int. Cl.
| | |
|---|---|
| A23F 5/20 | (2006.01) |
| A23F 5/46 | (2006.01) |
| A23L 29/00 | (2016.01) |
| A23F 5/14 | (2006.01) |

(52) U.S. Cl.
CPC .............. *A23F 5/202* (2013.01); *A23F 5/145* (2013.01); *A23F 5/465* (2013.01); *A23L 29/035* (2016.08)

(58) Field of Classification Search
CPC .................................................. A23L 29/035
See application file for complete search history.

(56) References Cited

U.S. PATENT DOCUMENTS

| | | | |
|---|---|---|---|
| 1,951,357 A | | 3/1934 | Hall |
| 2,455,256 A | * | 11/1948 | Jarowski ............... C11B 5/0035 554/7 |
| 2,641,612 A | | 6/1953 | Karl et al. |
| 4,508,745 A | * | 4/1985 | Fulger .................... C13K 13/00 426/594 |
| 5,888,549 A | * | 3/1999 | Buchholz ................. A23F 5/20 426/594 |
| 6,090,431 A | | 7/2000 | Franklin et al. |
| 6,277,428 B1 | | 8/2001 | Franklin et al. |
| 6,500,478 B2 | * | 12/2002 | Barahona .................. A23F 5/44 426/598 |
| 9,474,290 B2 | | 10/2016 | Young |
| 9,474,291 B2 | | 10/2016 | Young |
| 9,603,376 B2 | | 3/2017 | Young |
| 9,706,785 B2 | | 7/2017 | Breha, III |
| 9,756,869 B2 | | 9/2017 | Young |
| 9,844,224 B2 | | 12/2017 | Jia et al. |
| 9,883,691 B2 | | 2/2018 | Dierbach et al. |
| 10,155,043 B2 | | 12/2018 | Solaiman et al. |
| 10,182,583 B2 | | 1/2019 | Breha, III |
| 10,278,407 B2 | | 5/2019 | Breha, III |
| 2007/0178215 A1 | | 8/2007 | Beeson et al. |
| 2008/0118604 A1 | | 5/2008 | Mickowski et al. |
| 2009/0004360 A1 | | 1/2009 | Bingley et al. |
| 2010/0151087 A1 | * | 6/2010 | Dumarche ............ A23G 1/0006 426/660 |
| 2010/0210569 A1 | * | 8/2010 | Steliou .................... A61K 47/55 514/474 |
| 2011/0212240 A1 | | 9/2011 | Zehentbauer et al. |
| 2012/0035270 A1 | * | 2/2012 | Chaumont ................ A61P 7/00 514/652 |
| 2013/0136839 A1 | * | 5/2013 | Putter ..................... A23L 27/84 426/442 |
| 2013/0261136 A1 | * | 10/2013 | Chu ........................ A61Q 19/00 514/263.34 |
| 2016/0074449 A1 | * | 3/2016 | Miller .................... A61K 36/31 424/195.16 |
| 2016/0295890 A1 | * | 10/2016 | Maymon ................ A23C 9/156 |
| 2018/0116267 A1 | | 5/2018 | Dierbach et al. |
| 2018/0265487 A1 | * | 9/2018 | Froschmeier .......... A61Q 11/00 |
| 2021/0037866 A1 | * | 2/2021 | Zhang ..................... A23L 35/10 |

FOREIGN PATENT DOCUMENTS

| | | |
|---|---|---|
| DE | 19540014 | 4/1997 |
| EP | 0813816 | 12/1997 |
| GB | 1432904 | 4/1976 |
| JP | 402219542 | * 9/1990 |
| JP | 5-328935 | * 12/1993 |
| WO | 2006/045377 | 5/2006 |
| WO | 2019/040989 | 3/2019 |

OTHER PUBLICATIONS

English Translation for JP5-328935 published Dec. 1993.*
Gronas et al. Eur. Food Res. Technol. 2016. vol. 242. pp. 641-653.*
Green, Barry G. et al., "Enhancement of Retronasal Odors by Taste," Chemical Senses, vol. 37, Issue 1, Jan. 2012, pp. 77-86, https://doi.org/10.1093/chemse/bjr068.
Reiners, Jutta et al., "Interactions between ß-lactoglobulin and flavour compounds of different chemical classes. Impact of the protein on the odour perception of vanillin and eugenol." Le Lait, INRA Editions, 2000, 80 (3), pp. 347-360. 10.1051/lait:2000130. hal-00895411.
Haller, R. et al., "The Influence of Early Experience with Vanillin on Food Preference Later in Life," Chemical Senses, vol. 24, Issue 4, Aug. 1999, pp. 465-467, https://doi.org/10.1093/chemse/24.4.465.
Stanton, Catherine, "New Applications for Chocolate and Vanilla Ingredients," https://www.preparedfoods.com/articles/122//9-new-applications-for-chocolate-and-vanilla-ingredients; Aug. 27, 2019.

(Continued)

*Primary Examiner* — Anthony J Weier

(74) *Attorney, Agent, or Firm* — Michael A. Olshavsky

(57) ABSTRACT

The present invention relates to methods of reducing negative flavor attributes, such as bitterness, in coffee products. A coffee product with reduced perceptible bitterness may be prepared by providing a coffee product and adding vanillic acid to the coffee product.

19 Claims, No Drawings

(56) References Cited

OTHER PUBLICATIONS

Labbe, D., et al. "Modulation of perceived taste by olfaction in familiar and unfamiliar beverages." Food Quality and Preference 17.7-8 (2006): 582-589; Elsevier Ltd.
Rabe, S., "Influence of oil-in-water emulsion characteristics on initial dynamic flavour release," Journal of the Science of Food and Agriculture. Sep. 2003;83(11):1124-1133. DOI: 10.1002/jsfa.1513.
Hunter, R.S., "Photoelectric Color Difference Meter," J. of the Optical Soc. of Amer., vol. 48, pp. 985-995 (1958).
Sivetz, et al., Coffee Technology, "Drying Green Coffee Beans", pp. 117-169 (1979).

\* cited by examiner

METHODS FOR REDUCING NEGATIVE FLAVOR ATTRIBUTES IN COFFEE AND COMPOSITIONS THEREFROM

CROSS REFERENCE TO RELATED APPLICATIONS

This application claims priority to and any benefit of U.S. Provisional Application No. 62/887,820, entitled METHODS FOR REDUCING NEGATIVE FLAVOR ATTRIBUTES IN COFFEE AND COMPOSITIONS THEREFROM, and filed Aug. 16, 2019. The complete text of these patent applications are hereby incorporated by reference as though fully set forth herein in their entirety.

FIELD OF THE INVENTION

The present invention relates to reducing negative flavor attributes, such as bitterness in food and beverages, such as coffee and to various compositions made therefrom. More particularly, coffee compositions with reduced negative flavor attributes and methods for reducing negative flavor attributes in coffee are presented.

BACKGROUND

Bitterness is often undesirable in the food and beverage industry. Bitter blocking or masking compounds or ingredients are often added to reduce the bitter taste in food and beverage products to make the product more palatable to the consumer.

Coffee and similar consumable beverages may exhibit negative flavor attributes undesirable to the consumer, which may include but not limited to, for example, bitter, ashy, burnt, woody, and/or papery notes.

Creamers are well known in the art, in dry powder form or liquid form, for addition to such coffee or similar beverages for masking such undesired flavor attributes in these coffee beverages. See for example, U.S. Pat. Publ. No. 2007/0178215 A1, which discloses a de-bittering creamer wherein a commercially available de-bittering agent is added as part of the creamer to block negative flavor attributes. The de-bittering agent may comprise sodium salt, a potassium salt, gluconate, a bitterness blocker, and/or a combination of any one or more thereof.

Other consumable products may comprise bitter blockers such as theobromine, theophylline, trilobatin, hesperitin, and/or hesperitin dihydro chalcone 4-beta-D-glucoside (HDG) as disclosed in U.S. Pat. No. 9,844,224. The bitter blocker has a concentration of 0.3-200 parts per million (ppm).

One compound known as sophorolipids, such as C16-SL, C19-SL, C18:1-SL, and in various mixtures thereof, are also used to inhibit, modulate, or reduce bitter taste in edible compositions, as disclosed in U.S. Pat. No. 10,155,043. The composition may comprise at least one sophorolipid and optional carrier, and/or a bitter tastant therewith, wherein the bitter taste of the bitter tastant is inhibited, modulated, or reduced.

Ingredients such as palm sugar, burnt sugar, and/or powdered spices together with other ingredients such as cinnamon, ginger, lemon rind, coriander, and cardamom, and/or other powdered spices, have also been used in coffee powders to invert bitterness, as disclosed in DE19540014C2.

As disclosed in WO2019040989A1, consumable beverages that contain sugar substitutes, or low sugar or reduced sugar consumables, have been known to add extracts derived from sugar cane to improve or mask a taste such as bitterness. The extracts derived from sugar may include an amount of vanillic acid that is detectable by gas chromatography—mass spectrometry among a large number of other compounds.

Further, as disclosed in US20090004360A1, sweetener compositions have been developed to consist of a sweetener with sucrose equivalence, first non-sweetener composition with sucrose equivalence modifier, and second composition with sweet flavor modifier to modify the perception of a sweet flavor wherein said sweetener composition may comprise vanillic acid, among others.

Further, conventional methods of masking a bitter taste including the addition of using creamers, sweeteners, amino acids, and flavoring, alone or in various combinations may be inadequate at reducing or masking the bitter taste of food and beverage products.

Often these negative flavor attributes are masked by the addition of ingredients not naturally present in coffee or by the addition of flavor and/or spices. However, for consumers who do not wish to add the foregoing to their coffee, or who rather drink their coffee black, are looking for an alternative solution to reduce or mask the bitterness in coffee or beverages made therefrom.

Presently it would be desirable in the art to prepare food products with reduced perceptible bitterness without substantially altering the flavor of the food.

SUMMARY OF THE INVENTION

Disclosed herein are coffee compositions with reduced bitterness and methods for preparing coffee compositions with reduced bitterness. To illustrate various aspects of the present disclosure, several exemplary embodiments of the coffee compositions with reduced bitterness are provided.

In one embodiment, the present invention relates to a liquid coffee composition comprising: water; coffee solids; and vanillic acid, wherein the vanillic acid concentration in the is in the liquid coffee composition is in the range of about 0.5 ppm to about 12,000 ppm. The liquid coffee composition may not have a perceptible non-coffee flavor and can reduce the perception of bitterness in the liquid coffee composition.

In another embodiment, the present invention relates to a method of reducing the perceptible bitterness in a coffee product comprising: providing a coffee product; and adding vanillic acid to the coffee product. The vanillic acid may be extracted from a coffee product, coffee waste product, coffee cherries, coffee leaves, or any combinations thereof. Further, the vanillic acid may be added as part of the processing of the coffee product. The vanillic acid added to the coffee product is greater on a weight basis than any added vanillin.

In still yet another embodiment, the present invention relates to a method of reducing the perceptible bitterness in a coffee product comprising: providing a green coffee bean; adding at least one vanillic acid precursor to the green coffee bean; and roasting the green coffee bean and the at least one vanillic acid precursor.

In yet another embodiment, the present invention relates to a solid coffee composition comprising: a solid coffee product; and vanillic acid, wherein the amount of vanillic acid in the is in the solid coffee composition is in the range of about 0.5 ppm to about 20,000 ppm.

In still yet another embodiment, the present invention relates to a beverage composition comprising: a consumable beverage; and vanillic acid, wherein the vanillic acid concentration in the beverage composition is in the range of about 0.5 ppm to about 100 ppm.

These and other non-limiting aspects of the present disclosure are discussed further herein. The various features of novelty which characterize the invention are pointed out with particularity in the claims annexed to and forming a part of this disclosure. For a better understanding of the invention, its advantages and specific objects attained by its uses, reference is made to the accompanying descriptive matter and drawings in which various embodiments of the invention are illustrated.

DETAILED DESCRIPTION OF THE INVENTION

The following discussion is presented to enable a person skilled in the art to make and use one or more of the present embodiments. The general principles described herein can be applied to embodiments and applications other than those detailed below without departing from the spirit and scope of the disclosure. Therefore, the present embodiments are not intended to be limited to the particular embodiments shown, but are to be accorded the widest scope consistent with the principles and features disclosed or suggested herein.

Unless otherwise defined, all technical and scientific terms used herein have the same meaning as commonly understood by one of ordinary skill in the art to which the present invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are incorporated by reference in their entirety as though they are fully set forth herein.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that can vary depending on the desired properties sought to be obtained in embodiments of the present invention. Notwithstanding that the numerical ranges and parameters setting forth the broad scope of the invention are approximations; the numerical values set forth in the specific examples are reported with relative precision. Any numerical values, however, inherently contain certain errors necessarily resulting from error found in their respective measurements.

Terminology

Unless otherwise indicated expressly or from context, the following terms will have the following meanings:

"Brewed coffee" means a liquid coffee drink formed by extracting coffee solids from ground, roasted coffee beans. "Brewed coffee" includes coffee drinks formed from regular coffee (i.e., caffeinated coffee), decaffeinated coffee, liquid coffee concentrate, instant coffee. Unless specified otherwise, brewed coffee also describes a liquid drink made from a coffee substitute such as, for example, chicory.

"Coffee," "regular coffee," and "ground roast coffee" mean a mass of solid, non-decaffeinated particles derived by comminuting roasted coffee beans. Ground roast coffee can also be referred to as "roast coffee, ground coffee, or even a combination of roast coffee and ground coffee".

"Green coffee beans" and "green coffee" mean coffee seeds that have been at least partially removed from the coffee cherry and have not undergone heat treatment that would result in browning of the bean to a level that renders the coffee at a minimum—pasteurized and microbial safe for consumption. Green coffee may contain parchment and/or mucilage and may have undergone treatments such as drying, fermentation, etc.

"Coffee product" means any product derived from coffee beans. Coffee products include but are not limited to any brewed coffee, coffee, regular coffee, ground roast coffee, roast coffee, ground coffee, or even a combination of roast coffee and ground coffee, liquid coffee, decaffeinated coffee, liquid coffee concentrate or liquid coffee extract, coffee solids, and instant coffee.

"Coffee source" means any coffee product wherein said naturally occurring compound, such as vanillic acid, is extracted therefrom for use in the same or another coffee product.

"Coffee solids" means the coffee constituents that are extracted or extractable during the brewing of coffee. Unless indicated otherwise, the term coffee solids refers to both the dissolved coffee solids and suspended coffee solids (e.g., very small grinds or fines).

"Coffee substitute" refers to a substance which is customarily used as a replacement for coffee such as ground roast chicory, roasted soybeans, and roasted grains such as corn/maize, barley, rye, oats, rice, wheat germ, spelt, buckwheat, and millet.

"Decaffeinated coffee" refers to a solid derived from coffee beans, both roasted and unroasted, which contain a substantially reduced concentration of caffeine.

"Density," as it relates to ground roast coffee and unless otherwise indicated, refers to the number of ounces of that coffee that are needed to fill a container having a predetermined standard volume.

"Instant coffee" refers to a flowable, particulate coffee product that has been made by evaporating water from a previously made brewed coffee, usually by concentration and drying. Typical drying means, such as spray drying and freeze drying are known in the art. Furthermore, instant coffee used in the present invention can be prepared by any convenient process, of which a variety of processes are known to those skilled in the art. Additionally, instant coffee has many forms: spray dried powder, agglomerates, freeze dried and liquid. Moreover, the present invention can be made with any type of instant coffee powder. As those skilled in the art will appreciate, instant coffees may have a low yield or a high yield. Further, instant coffees may be of low quality or high quality. Unless specifically indicated, the term "instant coffee" is not limited to the use of any one type of instant coffee, but rather is to be broadly construed as applicable to any desired type and/or make of instant coffee. Instant coffees may include a high yield, high quality instant coffee, a high yield, low quality instant, or a low yield, low quality instant, or one or more combinations thereof.

"Liquid coffee concentrate" or "liquid coffee extract" as used herein designates an aqueous extract of the roasted coffee beans wherein the solids content is substantially greater than used for direct consumption as a beverage. The term as used here indicates a concentrated coffee extract, irrespective of this being liquid or a solid deep-frozen coffee concentrate. As is generally known coffee extracts, such as odorants, flavorings, dissolved coffee solids and suspended coffee solids, are recovered by contacting roasted and ground coffee beans with water or an aqueous solution. On an industrial scale, the intention is to achieve high extraction efficiency leading to extraction of aroma substances, that is odorants and flavorings, from the ground coffee. The concentration method is not particularly limited and can be performed by a known method and apparatus, evaporation, membrane concentration, concentration under reduced pressure, freeze concentration, and the like. In order to preserve aroma, it may be desirable to remove aromas prior to concentration, and later add aromas back into the concentrate. The aroma collection method is not particularly limited. Examples of such processes can include, but are not limited to steam stripping, distillation, flash evaporation, adsorption, and the like. This process utilizes hot and/or cool water and and/or steam to extract soluble coffee from roast and ground coffee. The liquid stream is then concentrated by either thermal evaporation or freeze concentration or an alternate method. A liquid coffee concentrate can be formed from coffee extracts that are recovered by contacting roasted and/or ground coffee beans with water or an aqueous solution wherein the sold is content is substantially greater than used for beverage purposes. This process utilizes hot and/or cool water and and/or steam to extract soluble coffee from roast and ground coffee. The liquid stream is then concentrated by either thermal evaporation or freeze concentration or an alternate method.

"Standard serving of brewed coffee" refers, for each country of the world, brewed coffee as customarily served in that country. For example, in the United States, brewed coffee is served in two different ways, regular strength and espresso strength. In both cases, about 3 grams to about 5 grams of ground roast coffee is used to make the brewed coffee. An exemplary Folgers brand medium roast, automatic drip coffee maker ("ADC") ground coffee is brewed using about 3 grams of the ground roast coffee having a density of about 0.33 g/cm$^3$ to make the brew. Regular strength coffee is made with about 5 fluid ounces to about 6 fluid ounces (about 150 mL to about 175 mL) of water, while espresso strength coffee is made with about 1.9 fluid ounces (about 55 mL) of water. Thus, in the United States, a "standard serving of brewed coffee" will be understood as referring to about 5 fluid ounces to about 6 fluid ounces (about 150 mL to about 175 mL) of regular strength brewed coffee as well as to roughly 1.9 fluid ounces (about 55 mL) of espresso strength brewed coffee.

The general inventive concepts encompass various embodiments that are based, at least in part, on the discovery that vanillic acid may be used to adjust the flavor profile of food and beverages such as coffee. Vanillic acid is naturally present in roast and ground coffee at low concentrations. However, it has been found that by increasing the amount of vanillic acid, the perception of bitterness of brewed coffee may be reduced. In addition to lowering the perception of bitterness in brewed coffee, vanillic acid may also adjust one or more other properties of brewed coffee such as mouth feel, smoothness, and body. Vanillic acid may be added to coffee products before or after the coffee is brewed. In certain embodiments, a vanillic acid precursor may be added to green coffee beans prior to roasting the green coffee beans to increase the amount of vanillic acid through the roasting process.

Those skilled in the art will appreciate that vanillic acid may also be referred to as 4-hydroxy-3-methoxybenzoic acid. In addition to coffee, vanillic acid is also found in wine and vinegar. Vanillic acid occurs naturally in *Angelica sinensis*, argan oil, and other plants. Vanillic acid may be prepared synthetically, for example, though the oxidization of vanillin, or in living organisms as an intermediate compound in the metabolic conversion of ferulic acid to vanillin. The flavor of vanillic acid in water is described as sweet, creamy, milky, and dairy.

As indicated above, vanillic acid is naturally present in roast and ground coffee in small amounts. The amount of naturally occurring vanillic acid in brewed coffee may vary based upon several factors such as the type of coffee bean, the extent and type of drying of the green coffee beans (e.g., the optional inclusion of a pre-drying step), the method and extent of the roasting process employed, and the method of brewing the coffee. In one or more embodiments, a brewed coffee may be characterized by the amount of naturally occurring vanillic acid. The concentration of vanillic acid may be determined by high performance liquid chromatography mass spectrometry (HPLC/MS). For example, an HPLC system by be utilized that includes C18 column and a mobile phase composition of 99% water with 0.1% formic acid and 1% acetonitrile with 0.1% formic acid may be used for the analysis. The multiple reaction monitor (MRM) transition for vanillic acid is 167.0→152.0 in negative mode.

In one or more embodiments, the brewed coffee may have less than 3 nanograms of naturally occurring vanillic acid per gram of brewed coffee (i.e., brewed coffee with no additional vanillic acid added), in other embodiments less than 2.5 nanograms of naturally occurring vanillic acid per gram of brewed coffee, in other embodiments less than 2 nanograms of naturally occurring vanillic acid per gram of brewed coffee, in other embodiments less than 1.5 nanograms of naturally occurring vanillic acid per gram of brewed coffee, in other embodiments less than 1 nanograms of naturally occurring vanillic acid per gram of brewed coffee, and in other embodiments less than 0.5 nanograms of naturally occurring vanillic acid per gram of brewed coffee. In certain embodiments, the amount of naturally occurring vanillic acid in the brewed coffee may be below the level of detection by HPLC/MS. In one or more embodiments, the brewed coffee may include naturally occurring vanillic acid in the range of about 3 nanograms to about 0.1 nanograms, in other embodiments in the range of about 2 nanograms to about 0.2 nanograms per gram of brewed coffee, and in other embodiments in the range of about 1 nanogram to about 0.3 nanograms per gram of brewed coffee.

While coffee is primarily exemplified herein, the inventive concepts are not particularly limited to coffee. Vanillic acid may be used to lower the perception of bitterness in foods, consumable beverages, or other consumable products such as pharmaceuticals for oral administration that include bitter tasting flavor compounds. Suitable foods that may include added vanillic acid include, but are not limited to, chocolate (e.g., dark chocolate and semisweet chocolate) bread, and pea protein isolate, soy protein isolate, whole grain breads including wheat, rye barely, and cruciferous vegetables. Suitable pharmaceutical applications that include bitter tasting flavor compounds include, but are not limited to, chewable tablets, such as aspirin. Suitable consumable beverages that may include added vanillic acid include one or more, or any combination of, coffee, tea, dairy-based products soy milk, almond milk, coconut milk, fruit juice or fruit-containing beverages, acai berries, extracts from berries, among others. In yet, further various embodiments of the invention, the product referring to a beverage includes, but is not limited to, a drinkable liquid or ready-to-drink products, including but not limited to for example, coffee or coffee-based drinks, tea or tea-based drinks, juice or juice-based drinks, dairy or dairy based drinks, and other similarly related drinkable products.

Vanillic acid may be used to adjust the flavor profile of a wide variety of coffee products. In one or more embodiments, a coffee composition includes a coffee product and vanillic acid.

Suitable coffee products that may include added vanillic acid can be made from and use virtually any type of one or more ground roast coffees, one or more instant coffees, one or more liquid coffee concentrate or liquid coffee extract, or ready to drink coffee product, or any combination thereof. In another embodiment, the present invention is made from two or more types of ground roast coffees, from two or more types of instant coffee, from two or more liquid coffee concentrate or liquid coffee extract, or ready to drink coffee product, or any combination thereof, or even with any number of one, two, three or four types of each of the foregoing coffee products and including any in combination with one another.

Ground roast coffee is made from coffee beans, which are the seeds of "cherries" that grow on coffee trees in a narrow subtropical region around the world. There are many coffee varieties, however, it is generally recognized that there are two primary commercial coffee species: *Coffea arabica* (herein "*arabica*(s)") and *Coffea canephora* var. *robusta* (herein "*robusta*(s)"). Coffees from the species *arabica* may be described as "Brazils," which come from Brazil, or "Other Milds" which are grown in other premium coffee producing countries. Premium *arabica* countries are generally recognized as including Colombia, Guatemala, Sumatra, Indonesia, Costa Rica, Mexico, United States (Hawaii), El Salvador, Peru, Kenya, Ethiopia and Jamaica. Coffees from the species *canephora* var. *robusta* are typically used as a low-cost extender or as a source of additional caffeine for *arabica* coffees. These *robusta* coffees are typically grown in the lower regions of West and Central Africa, India, South East Asia, Indonesia, and Brazil. See, U.S. Pat. Publ. No. 2008/0118604, the disclosure of which is incorporated herein by reference as though fully set forth in its entirety.

Regardless of the type of bean selected, coffee beans are typically prepared for consumption by drying and roasting the beans. When removed from the coffee cherry, coffee beans normally have a distinctly green color and a high moisture content. In one on or more embodiments, the coffee beans may be dried to a moisture content of about 12% by weight. Historically, solar drying was the method of choice, although machine drying is now normally used due to the reliability and efficiency of the machine dryers available for this purpose. See, Sivetz et al., Coffee Technology, "Drying Green Coffee Beans", pp. 112-169 (1979). In other embodiments, the coffee been may be "pre-dried" prior to roasting. In these or other embodiments, the coffee beans may be dried to a moisture content in the range of about 0.5% to about 15% by weight. Exemplary methods of pre-drying a coffee bean are disclosed in U.S. Pat. No. 5,160,757, which is incorporated herein it its entirety.

A variety of roasting techniques may be used to roast the green coffee beans. In one or more embodiments, coffee beans may be roasted in a hot gas medium. In these or other embodiments, the hot gas medium may be in the temperature range of about 175° C. to about 375° C., in other embodiments about 180° C. to about 260° C., in other embodiments about 200° C. to about 230° C., in other embodiments about 260° C. to about 290° C., and in other embodiments about 315° C. to about 350° C. Those skilled in the art will appreciate that the time of roasting is dependent on the flavor characteristics desired in the coffee beverage when brewed. In one or more embodiments, where the coffee beans are roasted in a batch process, the batch roasting time at the above-mentioned temperatures is from about 2 minutes to about 20 minutes, in other embodiments about 10 to about 20 minutes, in other embodiments about 12 to about 18 minutes, in other embodiments about 2 to about 10 minutes, in other embodiments about 2 to about 6 minutes, in other embodiments about 2 to about 4 minutes, and in other embodiments about 2 to about 3 minutes. In one or more embodiments, where the coffee beans are roasted in a continuous process, is from about the residence time at the above-mentioned temperatures of the coffee beans in the roaster is from about 30 seconds to about 9 minutes, in other embodiment about 30 seconds to 6 about minutes, in other embodiment about 30 seconds to about 4 minutes, and in other embodiment about 1 to about 3 minutes. The roasting procedure can involve static bed roasting as well as fluidized bed roasting. In certain embodiments, the roasting may be performed using fast roasters. While any method of heat transfer can be used in this regard, convective heat transfer, especially forced convection, is normally used for convenience. The convective media can be an inert gas or, more typically, air. In one or more embodiments, the beans are charged to a bubbling bed or fluidized bed roaster where they contact a hot air stream at inlet air temperature of from a 175° C. to about 650° C., in other embodiments from about 205° C. to about 425° C. In these or other embodiments, roast times may be from about 10 seconds to about 5.5 minutes, in other embodiments from about 10 to about 47 seconds.

In one or more embodiments, a vanillic acid precursor may be added to the green coffee beans prior to the roasting process. Advantageously, through the roasting process, the vanillic acid precursor is converted to vanillic acid. Accordingly, the resultant roasted coffee has an increased amount of vanillic acid. Suitable vanillic acid precursors include those compounds that may be converted to vanillic acid though the roasting process. Exemplary vanillic acid precursors include, but are not limited to, chlorogenic acids such as ferulic acid and quinic acid. The vanillic acid precursor may be added to the green coffee beans neat or as part of a solution.

A variety of different methods may be used to add a vanillic acid precursor to green coffee beans. The vanillic acid precursor may be sprayed onto the green coffee or the green coffee may be soaked in a solution that includes the vanillic acid precursor. Further, the green coffee may be optionally freeze dried prior to the inclusion of vanillic acid precursor via spraying or soaking. Moreover, the precursor may be added to green coffee that is steamed coffee or under a pressurized environment. The vanillic acid added to the bean prior, after, or contemporaneously with the addition of steam to the green beans. Optionally, vanillic acid may be added into the water used to prepare the steam. Methods of addition such as using adding a vanillic acid precursor to steamed green beans, freeze dried green beans, or addition under a pressurized environment help the vanillic acid precursor to penetrate into the green coffee beans, which may lead to a higher conversion of vanillic acid.

In one or more embodiments, the amount of the one or more vanillic acid precursor added to the green coffee beans may be described as a weight percent of the total weight of the vanillic acid precursor and green coffee beans. In one or more embodiments, the green coffee beans may include one or more vanillic acid precursors in the range of about 1 wt % to 15 wt % of solids, in other embodiments in the range of about 5 wt % to 14 wt % solids, and in other embodiments in the range of about 6 wt % to 13 wt % based on the total weight of the green coffee beans and the vanillic acid precursor. Here, as well as elsewhere in the specification and claims, individual numerical values, or limits, can be combined to form additional non-disclosed and/or non-stated ranges.

Once a desired amount of roasting has been reached, the beans may be promptly cooled using ambient air (e.g., 20° C. to 30° C.) and/or quenching. Cooling of the beans stops the roast-related pyrolysis reactions. Quenching, also referred to as water spray cooling, is where an amount of water sprayed onto the roasted beans and is carefully regulated so that most of the water evaporates off. Therefore, minimal water is absorbed by the roasted beans (e.g., typically less than 6%).

In one or more embodiments, vanillic acid may be added to the quenching water. In these or other embodiments, a solution of vanillic acid in water is applied to quench the hot, roasted beans. At least a portion of the water evaporates from the surface of the bean leaving a coating of vanillic acid on the outer and interior surface of the bean. In these or other embodiments, the vanillic acid may partially penetrate the surface of the bean. In one or more embodiments, the quenching water may include vanillic acid in the range of about 0.1 µg/g to about 250 µg/g, in other embodiments in the range of about 0.15 µg/g to about 200 µg/g, and in other embodiments in the range of about 0.19 µg/g to about 190 µg/g.

In one or more embodiments, the roasted coffee beans may be characterized by a Hunter L color. The Hunter Color "L" scale system may be used to define the color of the coffee beans and the degree to which they have been roasted. A complete technical description of the system can be found in an article by R. S. Hunter "Photoelectric Color Difference Meter", J. of the Optical Soc. of Amer., 48, 985-95 (1958). The Hunter Color "L" scale values are units of light reflectance measurement, and the higher the value, the lighter the color is since a lighter colored material reflects more light. In particular, in the Hunter Color system the "L" scale contains 100 equal units of division, where absolute black is at the bottom of the scale (L=0) and absolute white is at the top (L=100). Accordingly, the lower the "L" scale value the greater the degree of roast. Conversely, the darker is the color of the roasted bean. In one or more embodiments, the coffee may have a Hunter L color in the range of about 30 L to about 10 L in other embodiments in the range of about 25 L to about 10 L, and in other embodiments in the range of about 20 L to about 13 L.

After the beans are roasted they may be prepared for brewing or extracting, either on site or by the ultimate consumer, by grinding. Grinding may be performed using a conical burr, a blade, or a combination thereof. Particle size may be determined, for example, using laser diffraction. Suitable instruments for analyzing particle size include a Sympatec Rodos Helos laser particle size analyzer. In one or more embodiments, the ground coffee has a mean particle size distribution in the range of about 50 microns to about 1300 microns, in other embodiments in the range from about 100 microns to about 1200 microns, in other embodiments in the range from about 200 microns to about 1000 microns, in other embodiments in the range from about 400 microns to about 900 microns and in other embodiments in the range from about 650 microns to about 800 microns.

In one or more embodiments, the coffee composition can also be made from mixtures of one or more, two or more, three or more, or even four or more, of the coffees described above. For example, the coffee composition can be made from mixtures of ground roast coffees having different densities, different Hunter L colors, different particle sizes, different moisture contents, and different combinations thereof (i.e., one ground roast coffee could have a low density and a high moisture content while another ground roast coffee could have a medium density and a low moisture content). The coffee composition may also be made from mixtures of regular and high density coffees, mixtures of regular and low density coffees, mixtures of high and low density coffees, and mixtures of high, regular and low density coffees, if desired. In addition, the coffee composition may be made from mixtures ground roast coffees having high and low Hunter L color numbers, large and small average particle sizes, etc.

In one or more embodiments, the coffee composition may include one or more additives. For example, decaffeinated varieties of the above coffees can be used in addition to, or in place of, the ground roast coffees described above. Similarly, coffee substitutes such as ground chicory, roasted soybeans, and roasted grains such as corn, rye, wheat, barley, oats, rice, wheat germ, spelt, buckwheat, and millet can be included in the structured coffee composition (Instant coffee is not a "coffee substitute" in this context.). Coffee flavorings, as further discussed below, can be included. Also, various excipients such as binders and disintegration aids can be included and, surprisingly, it has been found that some liquid flavor carriers act as a binder in coffee products. See for example, as disclosed in U.S. Pat. Nos. 9,756,869; 9,603,376; 9,474,291; 9,474,290; 6,277,428; 6,090,431; 1,951,357, and EP 813816, the entire disclosures of all of these patents are incorporated herein by reference as though fully set forth herein in their entireties.

Flavorants, both liquid and solid (or dry), can be included in the coffee composition in conventional amounts. Exemplary flavorants include French vanilla, hazelnut, amaretto, cappuccino, chocolate, mint, peppermint, cinnamon, vanilla, caramel, maple, toffee, pumpkin, spices, Irish Cream, Kahlua®, Crème Brulee, and nut flavors such as almond and macadamia nut, and so forth. The flavorants that can be used include those known to the skilled artisan, such as natural and artificial flavorants. A solid sweetener such as white granulated sugar may be used in connection with the structured coffee product. Examples of a whitening agent that can be used in connection with the structured coffee products include liquid dairy components and dry dairy components. Other suitable sweeteners that can be used in connection with the structured coffee compositions are those well known in the art, including both natural and artificial sweeteners, including but not limited to also high intensity sweeteners. See, for example, U.S. Pat. Nos. 9,706,785; 10,182,583; and 10,278,407, which disclose flavorants, sweeteners, and whitening agents for inclusion into the structured coffee products. These patent applications are hereby incorporated by reference as though fully set forth herein in their entirety.

While some embodiments, natural and artificial flavors may be added to the vanillic acid coffee composition, in other embodiments, the vanillic acid coffee composition does not include a perceptible non-coffee flavor. In one or more embodiments, the vanillic acid is the only component that adjusts the flavor profile of the of the vanillic acid coffee composition.

As indicated above, coffee products that include vanillic acid may also include a vanilla flavor. In other embodiments, the coffee products that include vanillic acid will not have an added vanilla flavor. In certain embodiments, coffee product will not have a perceptible taste of vanilla. As those skilled in the art will appreciate, natural vanilla extract includes a variety of compounds. The main constituent of the vanilla extract that is responsible for the vanilla flavor is vanillin. In addition to vanillin, the natural vanilla extract may also include vanillic acid. The amount of vanillin in a vanilla extract is typically about 15 times higher than the amount of vanillic acid. In one or more embodiments, the coffee products that include vanillic acid may be free of vanillin. In other embodiments, the coffee composition may include trace or low amounts of vanillin, for example, as an impurity or from extraction from a roasted coffee bean. In these or other embodiments, the amount of vanillic acid may be greater than the amount of vanillin. In one or more embodiments, coffee products that include vanillic acid may have a weight to weight ratio of vanillic acid to vanillin that is greater than 1:10, in other embodiments, greater than 1:5, in other embodiments greater than 1:1, in other embodiments, greater than 2:1, in other embodiments, greater than 3:1, in other embodiments, greater than 5:1, in other embodiments, greater than 10:1. Here, as well as elsewhere in the specification and claims, individual numerical values, or limits, can be combined to form additional non-disclosed and/or non-stated ratios.

In one or more embodiments, the coffee products that include vanillic acid may include a sweetener such as a sugar, sugar substitute, or a combination thereof. In certain embodiments, the sweetener is present in the coffee product that include vanillic acid, but not in an amount that will provide a perception of sweetness. In other embodiments, the coffee product that include vanillic acid does not include a sweetener.

In one or more embodiments, the roasted (and optionally ground) coffee may be brewed or otherwise extracted and formed into one or more coffee products.

In one or more embodiments, vanillic acid may be added to a solid coffee product. Solid coffee products include coffee products that have a low percentage of water content by weight (e.g., less than 13 wt %), and may be brewed extracted or otherwise form a coffee drink through the addition of water. In one or more embodiments, the solid coffee product may be in the form of a bean, a ground, a particle, a powder, an agglomerate, and/or a three-dimensional coffee structure. Specific examples of solid coffee products include, but are not limited to, coffee beans (i.e., roasted or green), coffee grounds, spray dried powder instant coffee, agglomerated instant coffee, freeze dried instant coffee, and vacuum dried instant coffee. In one or more embodiments, the solid coffee product may include a structure formed of one or more coffee products that may optionally be held together with a binder. Suitable structured coffee product include three dimensional structures that include one or more flowing shapes: ovals, spheres, hearts, diamonds, triangles, and pillows. In these or other embodiments, the vanillic acid may be added neat or as in a carrier solution, such as, for example water, alcohol, or another aqueous solution.

Vanillic acid may be applied to the solid coffee product by various methods such as spraying, soaking, coating, and direct spiking. The vanillic acid may also be part of the formulation of the coffee product or be added as part of a coating agent to the coffee. In certain embodiments, the solid coffee product may have a coating of vanillic acid on at least a portion of the surface of the coffee product. As indicated above, coffee products typically have a small amount of vanillic acid. In one or more embodiments, where the solid coffee product has a coating of vanillic acid, the interior of the solid coffee product (e.g., bean, ground, or powdered granule) has a lower concentration of vanillic acid than the exterior of the solid coffee product. In other embodiments, such as, for example, where a coffee bean that has a vanillic acid coating is ground, the coffee product may have a non-heterogeneous distribution of vanillic acid throughout the coffee product. In these or other embodiments, the coffee product may partially coat a portion of the coffee product.

In certain embodiments, during the addition of vanillic acid to a solid coffee product, a matrix of coffee extracts and vanillic acid may be formed on the solid coffee product. When vanillic acid is added in using a carrier solution, the carrier solution may extract a portion of the coffee extracts from the solid coffee product. Accordingly, when the carrier solution is removed (e.g., via drying) the outer surface of the solid coffee product has a matrix of vanillic acid and coffee extract. In one or more embodiments, the coffee extract matrix may be prepared with coffee beans, coffee grounds, spray dried powder instant coffee, agglomerated instant coffee, freeze dried instant coffee, and vacuum dried instant coffee. In one or more embodiments, where the matrix at least partially surrounds a ground roast coffee particle, the matrix may be referred to as a coating.

In one or more embodiments, the amount of the vanillic acid added in the solid coffee product may be described by the weight fraction of vanillic acid out of the total weight of the liquid coffee product in parts per million. In one or more embodiments, the solid coffee product may include vanillic acid in an amount of greater than 0.5 ppm, in other embodiments greater than 1 ppm, in other embodiments greater than 3 ppm, in other embodiments greater than 5 ppm, in other embodiments greater than 10 ppm, in other embodiments greater than 20 ppm, in other embodiments greater than 50 ppm, in other embodiments greater than 100 ppm, in other embodiments greater than 150 ppm, in other embodiments greater than 200 ppm, in other embodiments greater than 250 ppm, in other embodiments greater than 300 ppm, in other embodiments greater than 350 ppm, in other embodiments greater than 400 ppm, in other embodiments greater than 450 ppm, and in other embodiments greater than 500 ppm. In these or other embodiments, the solid coffee product may include vanillic acid in an amount of less than 20,000 ppm, in other embodiments less than 17,000 ppm, in other embodiments less than 15,000 ppm, in other embodiments less than 12,000 ppm, in other embodiments less than 10,000 ppm, in other embodiments less than 8,000 ppm, in other embodiments less than 6,000 ppm, in other embodiments less than 4,000 ppm, in other embodiments less than 3,500 ppm, in other embodiments less than 3,000 ppm, in other embodiments less than 2,500 ppm, in other embodiments less than 2,000 ppm, in other embodiments less than 1,500 ppm, in other embodiments less than 1,000 ppm, in other embodiments less than 800 ppm, and in other embodiments less than 650 ppm. In one or more embodiments, the solid coffee product may include vanillic acid in the range of about 0.5 ppm to about 20,000 ppm, in other embodiments in the range of 1 ppm to about 17,000 ppm, in other embodiments in the range of 3 ppm to about 15,000 ppm, in other embodiments in the range of 5 ppm to about 12,000 ppm, in other embodiments in the range of 10 ppm to about 10,000 ppm, in other embodiments in the range of 20 ppm to about 8,000 ppm, in other embodiments in the range of 50 ppm to about 6,000 ppm, in other embodiments in the range of 100 ppm to about 4,000 ppm, in other embodiments in the range of 150 ppm to about 3,500 ppm, in other embodiments in the range of 200 ppm to about 3,000 ppm, in other embodiments in the range of 250 ppm to about 2,500 ppm, in other embodiments in the range of 300 ppm to about 2,000 ppm, in other embodiments in the range of 350 ppm to about 1,500 ppm, in other embodiments in the range of 400 ppm to about 1,000 ppm, in other embodiments in the range of 450 ppm to about 800 ppm, and in other embodiments in the range of 500 ppm to about 650 ppm. Here, as well as elsewhere in the specification and claims, individual numerical values, or limits, can be combined to form additional non-disclosed and/or non-stated ranges.

In one or more embodiments, the solid coffee composition may be characterized by the ratio of the vanillic acid in the solid coffee composition to the vanillic acid in a similar composition identical to the solid coffee composition with the exception that it is prepared without the addition of vanillic acid or a vanillic acid precursor (which may be referred to as the pre-vanillic acid solid coffee composition). In these or other embodiments, the ratio of the vanillic acid in the solid coffee composition to the pre-vanillic acid solid coffee composition may be at least 50:1, in other embodiments, at least 100:1, in other embodiments at least 500:1, in other embodiments at least 1,000:1, in other embodiments at least 5,000:1, in other embodiments at least 10,000:1, in other embodiments at least 50,000:1, and in other embodiments at least 100,000:1. Accordingly, the addition of vanillic acid to the solid coffee composition may increase the vanillic acid by a factor of 50, in other embodiments 100, in other embodiments 500, in other embodiments 1,000, in other embodiments 5,000, in other embodiments 10,000, in other embodiments 50,000, and in other embodiments 100,000. Here, as well as elsewhere in the specification and claims, individual numerical values, or limits, can be combined to form additional non-disclosed and/or non-stated ratios or factors. In certain embodiments, where the solid coffee composition has a non-detectable amount of vanillic acid, the addition of vanillic acid is in an amount that is detectable in the solid coffee composition.

In one or more embodiments, vanillic acid may be added to a liquid coffee product. Liquid coffee products include coffee compositions that include water and coffee solids. Examples of liquid coffee products include, but are not limited to, brewed regular coffee, brewed decaffeinated coffee, decaffeinated liquid coffee concentrate, decaf liquid coffee extract, regular liquid coffee extract, ready to drink coffee, and combinations thereof. In these or other embodiments, the vanillic acid may be added neat or as in a carrier solution, such as, for example water, alcohol, or another aqueous solution.

In certain embodiments, the vanillic acid may be included in the liquid coffee product as part of a coffee flavoring composition. In one or more embodiments, the coffee flavoring composition may include natural flavor extracts, artificial flavors, sweeteners, dairy products, creamers, natural plant extracts, and combinations thereof. In one or more embodiments, the amount of the vanillic acid in the liquid coffee product may be described by the weight fraction of vanillic acid out of the total weight of the liquid coffee product in parts per million.

In one or more embodiments, the amount of the vanillic acid in the liquid coffee product may be described by the weight fraction of vanillic acid out of the total weight of the liquid coffee product in parts per million. In one or more embodiments, the amount of vanillic acid in the liquid coffee product may be greater than 0.5 ppm, in other embodiments greater than 1 ppm, in other embodiments greater than 2 ppm, in other embodiments greater than 5 ppm, in other embodiments greater than 10 ppm, in other embodiments greater than 20 ppm, in other embodiments greater than 30 ppm, in other embodiments greater than 40 ppm, in other embodiments greater than 50 ppm. in other embodiments greater than 100 ppm, in other embodiments greater than 250 ppm, in other embodiments greater than 400 ppm, in other embodiments greater than 500 ppm, and in other embodiments greater than 1,000 ppm. In one or more embodiments, the amount of vanillic acid in the liquid coffee product may be less than 12,000 ppm, in other embodiments less than 11,500 ppm, in other embodiments less than 10,000 ppm, in other embodiments less than 9,000 ppm, in other embodiments less than 8,500 ppm, in other embodiments less than 7,500 ppm, in other embodiments less than 7,000 ppm, in other embodiments less than 6,000 ppm, in other embodiments less than 4,000 ppm, in other embodiments less than 3,500 ppm, in other embodiments less than 3,000 ppm, in other embodiments less 2,500 ppm, in other embodiments less than 2,000 ppm, and in other embodiments less than 1,500 ppm. In one or more embodiments, the amount of vanillic acid in the liquid coffee product may be in the range of about 0.5 ppm to about 12,000 ppm, in other embodiments in the range of about 1 ppm to about 11,500 ppm, in other embodiments in the range of about 2 ppm to about 10,000 ppm, in other embodiments in the range of about 5 ppm to about 9,000 ppm, in other embodiments in the range of about 10 ppm to about 8,500 ppm, in other embodiments in the range of about 20 ppm to about 7,500 ppm, in other embodiments in the range of about 30 ppm to about 7,000 ppm, in other embodiments in the range of about 40 ppm to about 6,000 ppm, in other embodiments in the range of about 50 ppm to about 4,000 ppm. in other embodiments in the range of about 100 ppm to about 3,500 ppm, in other embodiments in the range of about 250 ppm to about 3,000 ppm, in other embodiments in the range of about 400 ppm to about 2,500 ppm, in other embodiments in the range of about 500 ppm to about 2,000 ppm, and in other embodiments in the range of about 1,000 ppm to about 1,500 ppm. Here, as well as elsewhere in the specification and claims, individual numerical values, or limits, can be combined to form additional non-disclosed and/or non-stated ranges, ratios, or factors.

In one or more embodiments, the liquid coffee product may be described by the weight percent of coffee solids out of the total weight of the liquid coffee product. In one or more embodiments, the weight percent of coffee solids in the vanillic acid coffee composition may be from 0.5 wt % to 60 wt %, in other embodiments from 0.6 wt % to 58 wt %, in other embodiments from 0.7 wt % to 52 wt %, in other embodiments from 0.8 wt % to 50 wt %, in other embodiments from 0.9 wt % to 45 wt %, in other embodiments from 1 wt % to 30 wt %, in other embodiments from 1.1 wt % to 25 wt %, in other embodiments from 1.2 wt % to 20 wt %, in other embodiments from 1.3 wt % to 15 wt %, and in other embodiments from 1.5 wt % to 12 wt %. Here, as well as elsewhere in the specification and claims, individual numerical values, or limits, can be combined to form additional non-disclosed and/or non-stated ranges.

In one or more embodiments, the amount of the vanillic acid in the liquid coffee product may be described by the weight ratio of vanillic acid in the liquid coffee product to the coffee solids in the liquid coffee product. In one or more embodiments, the weight ratio of vanillic acid in the liquid coffee product to the coffee solids in in the liquid coffee product may be greater than 1:40, in other embodiments greater than 1:60, in other embodiments greater than 1:80, in other embodiments greater than 1:100, in other embodiments greater than 1:150, in other embodiments greater than 1:200, in other embodiments greater than 1:250, in other embodiments greater than 1:300, in other embodiments greater than 1:400, In one or more embodiments, the weight ratio of vanillic acid in the liquid coffee product to the coffee solids in in the liquid coffee product may be less than 1:40, in other embodiments less than 1:1200, in other embodiments less than 1:1100, in other embodiments less than 1:1000, in other embodiments less than 1:900, in other embodiments less than 1:800, in other embodiments less than 1:700, in other embodiments less than 1:600, and in other embodiments less than 1:500. Here, as well as elsewhere in the specification and claims, individual numerical values, or limits, can be combined to form additional non-disclosed and/or non-stated ratios.

In one or more embodiments, the liquid coffee composition may be characterized by the ratio of the vanillic acid in the liquid coffee composition to the vanillic acid in a similar composition identical to the liquid coffee composition with the exception that it is prepared without the addition of vanillic acid or a vanillic acid precursor (which may be referred to as the pre-vanillic acid liquid coffee composition). In these or other embodiments, the ratio of the vanillic acid in the liquid coffee composition to the pre-vanillic acid liquid coffee composition may be at least 100:1, in other embodiments at least 500:1, in other embodiments at least 1,000:1, in other embodiments at least 5,000:1, in other embodiments at least 10,000:1, in other embodiments at least 50,000:1, and in other embodiments at least 100,000:1. Accordingly, the addition of vanillic acid to the liquid coffee composition may increase the vanillic acid by a factor of 100, in other embodiments 500, in other embodiments 1,000, in other embodiments 5,000, in other embodiments 10,000, in other embodiments 50,000, and in other embodiments 100,000. Here, as well as elsewhere in the specification and claims, individual numerical values, or limits, can be combined to form additional non-disclosed and/or non-stated ratios or factors. In certain embodiments, where the liquid coffee composition has a non-detectable amount of vanillic acid, the addition of vanillic acid is in an amount that is detectable in the liquid coffee composition.

In one or more embodiments, the vanillic acid added to the coffee product may be extracted from a coffee source. Coffee sources may include a coffee products or a coffee waste product. In one or more embodiments, the vanillic acid may be extracted from coffee cherries, leaves, or coffee scrap or waste from a product plant of facility that produces coffee products. Coffee waste products include products derived from the manufacture of a coffee product that are not included in the consumable coffee products. Coffee waste products may also include low grade or stale coffee products. The extraction of vanillic acid from a coffee product may be performed, for example, using a resin materials (e.g., a C18 column), ion exchange and/or solvent extraction. After the vanillic acid is extracted from the coffee product or a coffee waste product, the vanillic acid may be added to a second coffee product as described above.

In an ionic change extraction, a solution of the coffee solids from the coffee product or coffee waste product may be added to an ion-exchange resin. Based on the acidic strength of the soluble coffee solids and pH of the solution employed to dissolve the soluble coffee solids, certain soluble coffee solids will be trapped in the ion-exchange resin (including the vanillic acid). The vanillic acid may then be released from the ion-exchange resin by adjusting the pH of the solution containing the ion exchange resin. The vanillic acid may be further purified, concentrated, or dried into a solid prior to addition to a coffee product.

In the solvent extraction method, a solvent is employed to extract vanillic acid from a coffee product or a coffee waste product. Suitable solvents for use in the solvent extraction process include, but are not limited to water, ethanol, ethyl acetate, hexane, and dichloromethane. Industry standard methods of extraction may be formed, such as ethyl acetate or generally solvent extraction such as that disclosed in U.S. Pat. Publ. No. 2011/0212240, which is incorporated herein in its entirety. The vanillic acid may be further purified, concentrated, or dried into a solid prior to addition to a coffee product.

Regardless of how the vanillic acid is added to a coffee product, a coffee composition that includes water, coffee solids, and vanillic acid may be prepared. As used herein, the coffee composition that includes water, coffee solids, and vanillic acid may be referred to as a vanillic acid coffee composition. In one or more embodiments, the vanillic acid coffee composition may be a brewed coffee.

In one or more embodiments, the amount of the vanillic acid in the vanillic acid coffee composition may be described by the weight fraction of vanillic acid out of the total weight of the vanillic acid coffee composition in parts per million. In one or more embodiments, the amount of vanillic acid in the vanillic acid coffee composition may be greater than 0.5 ppm, in other embodiments greater than 1 ppm, in other embodiments greater than 2 ppm, in other embodiments greater than 5 ppm, in other embodiments greater than 10 ppm, in other embodiments greater than 15 ppm, in other embodiments greater than 20 ppm, in other embodiments greater than 25 ppm, in other embodiments greater than 30 ppm, in other embodiments greater than 35 ppm, in other embodiments greater than 40 ppm, in other embodiments greater than 45 ppm, and in other embodiments greater than 50 ppm. In one or more embodiments, the amount of vanillic acid in the vanillic acid coffee composition may be less than 200 ppm, in other embodiments less than 190 ppm, in other embodiments less than 170 ppm, in other embodiments less than 150 ppm, in other embodiments less than 140 ppm, in other embodiments less than 125 ppm, in other embodiments less than 115 ppm, in other embodiments less than 100 ppm, in other embodiments less than 95 ppm, in other embodiments less than 90 ppm, in other embodiments less 85 ppm, in other embodiments less than 80 ppm, and in other embodiments less than 70 ppm. In one or more embodiments, the amount of vanillic acid in the vanillic acid coffee composition include vanillic acid in the range of about 0.5 ppm to about 200 ppm, in other embodiments in the range of about 1 ppm to about 190 ppm, in other embodiments in the range of about 2 ppm to about 170 ppm, in other embodiments in the range of about 5 ppm to about 150 ppm, in other embodiments in the range of about 10 ppm to about 140 ppm, in other embodiments in the range of about 15 ppm to about 125 ppm, in other embodiments in the range of about 20 ppm to about 115 ppm, in other embodiments in the range of about 25 ppm to about 100 ppm, in other embodiments in the range of about 30 ppm to about 95 ppm, in other embodiments in the range of about 35 ppm to about 90 ppm, in other embodiments in the range of about 40 ppm to about 85 ppm, in other embodiments in the range of about 45 ppm to about 80 ppm, and in other embodiments in the range of about 50 ppm to about 70 ppm. Here, as well as elsewhere in the specification and claims, individual numerical values, or limits, can be combined to form additional non-disclosed and/or non-stated ranges, ratios or factors.

In one or more embodiments, the vanillic acid coffee composition may be described by the weight percent of coffee solids out of the total weight of the vanillic acid coffee composition. In one or more embodiments, the weight percent of coffee solids in the vanillic acid coffee composition may be from 0.5 wt % to 12 wt %, in other embodiments from 0.6 wt % to 11 wt %, in other embodiments from 0.7 wt % to 11 wt %, in other embodiments from 0.8 wt % to 10 wt %, in other embodiments from 0.9 wt % to 9 wt %, in other embodiments from 1 wt % to 8 wt %, in other embodiments from 1.1 wt % to 6 wt %, in other embodiments from 1.2 wt % to 4 wt %, in other embodiments from 1.3 wt % to 3.5 wt %, and in other embodiments from 1.5 wt % to 3 wt %. Here, as well as elsewhere in the specification and claims, individual numerical values, or limits, can be combined to form additional non-disclosed and/or non-stated rangse.

In one or more embodiments, the vanillic acid coffee composition may be characterized by the ratio of the vanillic acid in the vanillic acid coffee composition to the vanillic acid in a similar composition identical to the vanillic acid coffee composition with the exception that it is prepared without the addition of vanillic acid or a vanillic acid precursor (which may be referred to as the pre-vanillic acid coffee composition). In these or other embodiments, the ratio of the vanillic acid in the vanillic acid coffee composition to the pre-vanillic acid coffee composition may be at least 50:1, in other embodiments at least 100:1, in other embodiments at least 500:1, in other embodiments at least 1,000:1, in other embodiments at least 5,000:1, in other embodiments at least 10,000:1, in other embodiments at least 50,000:1, and in other embodiments at least 100,000:1. Here, as well as elsewhere in the specification and claims, individual numerical values, or limits, can be combined to form additional non-disclosed and/or non-stated ratios.

EXAMPLES

Natural Occurring Vanillic Acid Concentration in Predried and Unpretreated Coffee Vanillic acid is natural occurring in brewed coffee from predried and unpretreated coffee. Colombian predried coffee and unpretreated coffee were brewed with an automatic drip coffee maker ADC brewer with a drop weight of 29.5 grams of roast and ground coffee in 1420 mL water. Three different samples of each were evaluated. Table 1 below details the amount of naturally occurring vanillic acid in such coffee brew.

TABLE 1

| Conc. | 12 Colombian Predry 16.03 L (ng/g of brewed coffee) | 12 Colombian 16.13 L (ng/g of brewed coffee) |
|---|---|---|
| 1 | 0.44 | 0.34 |
| 2 | 0.46 | 0.31 |
| 3 | 0.45 | 0.32 |
| Standard Deviation (SD) | 0.01 | 0.02 |
| Average | 0.45 | 0.32 |

Vanillic acid concentration can be enhanced by pretreatment of green bean. Preliminary data showed that the predried roast and ground coffee is more concentrated in vanillic acid than non-pretreated coffee.

Natural Occurring Vanillic Acid Concentration in Brewed Coffee

Vanillic acid is natural occurring in brewed coffee. Various types and sources of coffee from a variety of locations was brewed with an eight (8) cup Mr. Coffee ADC brewer with a drop weight of 29.5 grams of roast and ground coffee in 1420 mL water. Table 2 below details the amount of naturally occurring vanillic acid in such coffee brew.

TABLE 2

Comparison of Vanillic Acid Concentration in Brewed Coffee

| | Coffee type | | | | | | | |
|---|---|---|---|---|---|---|---|---|
| | Robusta | | Arabica | | | | | |
| | | | Roast and Ground Coffee | | | | | |
| | 22 Brazil (16 L) | 22 Vietnam (16 L) | 12 Colombia (16 L) | 18 Brazil (16 L) | Guate (16 L) | Guate (14 L) | Guate (19 L) | Guate (21 L) |
| Concentration (ng/g of brewed coffee) | 0.47 | 0.26 | 0.39 | 0.53 | 0.31 | 0.45 | 0.25 | 0.24 |

Vanillic acid is a naturally present in roast and ground coffee at low concentrations. Brewed coffee, using conventional ADC Mr. Coffee brewer contains concentration range of 0.1-1 nanogram of vanillic acid per gram of brewed coffee (ng/g) using the process discussed above.

Comparison of Pure Vanilla Extract, Synthetic Vanillin, and Vanillic Acid in Coffee Pure vanilla extract is a mixture of vanilla bean extractives by alcohol, balanced with water, sugar and other additives. The standard of identity for pure vanilla extract must contains at least 13.35% vanilla extractives. The vanilla extractive has hundreds of different compound and two primary components are vanillin and ethylvanillin.

Synthetic vanillin is also called imitation vanilla, is widely used to mimic the flavor of vanilla as a cheaper alternative. Vanillin can be derivatized from guaiacol or lignin. The odor and flavor description in water is described as vanilla, sweet, pleasant and balsamic.

Experiment Design:

Starbucks Pike Place was brewed as a dark coffee base with the drop weight of 29.5 g coffee in 1420 mL water in an ADC brewer. The coffee was cooled to room temperature. Three samples A, B and C was made by spiking 20 microgram of vanillic acid per gram of brewed coffee (µg/g), 20 µg/g vanillin and 100 µg/g of vanillin extract into the brewed coffee, respectively. A black brewed coffee (i.e., coffee only) sample was used for reference.

All panelists were asked to taste the reference and samples A, B and C and compare the flavor, bitterness, burnt flavor and other flavor/mouthfeel differences. The score of difference and description were evaluated.

Results:

All panelists are rating the sample A (spiked with vanillic acid) as 0.3 (very slight difference), with the less bitterness, smoother mouthfeel with more tea-like flavor. Sample B, which was spiked with vanillin, was rated as 0.8 (moderately different). Sample B was described as sweet, "vanilla-y", creamy flavor, sweet-finish in an almost artificial sweetener aftertaste. Sample C was found to be the most different from the reference sample. The scale of difference is 1.2 and described as creamy mouthfeel with vanilla flavor, smoother and not bitter.

Overall, vanillic acid is found to cause change in coffee bitterness and mouthfeel without changing the coffee flavor profile. In the meanwhile, samples spiked with vanillin and natural vanilla extract were considered as vanilla flavored coffee with more changes in the whole coffee flavor.

Working Example 1

Table 3 provides details an experiment conducted to understand the effect of extracting vanillic acid from coffee with various solvents. The extraction yield is ng per gram of coffee (grind size: auto drip). 16.58 L 22 Brazil 1.0000+/− 0.001 g into a 20 mL clear vial and stirred with solvent for 2 hours for extraction. Five (5) different solvents were used to extract vanillic acid from coffee, including: (1) water, (2) ethanol, (3) ethyl acetate, (4) hexane, and (5) dicholomethane. Three different samples of each are evaluated. The extraction levels of vanillic acid concentration are detailed below in Table 3.

TABLE 3

| Conc. (ng/g) | Water | Ethanol | Ethyl Acetate | Hexane | Dichloromethane |
|---|---|---|---|---|---|
| 1 | 0.11 | 1.52 | 2.46 | 0.70 | 1.52 |
| 2 | 0.12 | 1.56 | 2.52 | 0.76 | 1.56 |
| 3 | 0.12 | 1.64 | 2.62 | 0.72 | 1.54 |
| SD | 0.00 | 0.06 | 0.08 | 0.03 | 0.02 |
| RSD | 6.90 | 7.77 | 6.38 | 8.41 | 2.60 |
| Average | 0.12 | 1.57 | 2.53 | 0.73 | 1.54 |

Vanillic acid may be extracted from R&G coffee using a reversed phase column, and added back in to whole bean coffee prior to grinding. Vanillic acid may also be added back to coffee using quench water. The current results indicate that vanillic acid can be extracted from coffee with ethyl acetate, ethanol, dichloromethane with much higher yield than water, in which ethyl acetate and dichloromethane can extract the precursor compounds through decaffeination.

Working Example 2

Table 4 provides details an experiment conducted to understand the effect of extracting vanillic acid from coffee with various solvents. The extraction yield is ng per gram of coffee (grind size: auto drip). A variety of coffees 1.0000+/− 0.001 g into a 20 mL clear vial and stirred with solvent for 2 hours for extraction. Five (5) different solvents were used to extract vanillic acid from coffee, including: (1) water, (2) ethanol, (3) ethyl acetate, (4) hexane, and (5) dichloromethane. Three different samples of each are evaluated. The extraction levels of vanillic acid concentration are detailed below in Table 4.

TABLE 4

| | 22 Brazil 16.63 L | 22 Brazil Green | 18 Brazil 16.52 L | 18 Brazil 14.68 L | 18 Brazil 11.06 L | 18 Brazil steamed 11.06 L | 12 Colombian Predry 16.03 L | 12 Colombian 16.13 L |
|---|---|---|---|---|---|---|---|---|
| 1 | 0.42 | <LOD | 0.50 | 0.61 | 0.70 | 0.17 | 0.44 | 0.34 |
| 2 | 0.45 | <LOD | 0.53 | 0.65 | 0.71 | 0.20 | 0.46 | 0.31 |
| 3 | 0.44 | <LOD | 0.52 | 0.63 | 0.74 | 0.18 | 0.45 | 0.32 |
| SD | 0.02 | N/A | 0.02 | 0.02 | 0.02 | 0.02 | 0.01 | 0.02 |
| RSD | 3.50 | N/A | 2.96 | 3.17 | 2.90 | 8.33 | 2.22 | 4.72 |
| Average | 0.44 | <LOD | 0.52 | 0.63 | 0.72 | 0.18 | 0.45 | 0.32 |

| | 22 Vietnam 16.30 | 18 Brazil 16.17 L French Press | 18 Brazil 16.52 L SAX | 22 Brazil 16.58 L by water | 22 Brazil 16.58 L by EtOH | 22 Brazil 16.58 L by Ethyl Acetate | 22 Brazil 16.58 L by hexane | 22 Brazil 16.58 L by dichloromethane |
|---|---|---|---|---|---|---|---|---|
| 1 | 0.29 | 0.16 | 0.14 | 0.06 | 0.76 | 1.23 | 0.35 | 0.76 |
| 2 | 0.27 | 0.17 | 0.15 | 0.06 | 0.78 | 1.26 | 0.38 | 0.78 |
| 3 | 0.27 | 0.16 | 0.14 | 0.06 | 0.82 | 1.31 | 0.36 | 0.77 |
| SD | 0.01 | 0.01 | 0.01 | 0.00 | 0.03 | 0.04 | 0.02 | 0.01 |
| RSD | 4.17 | 3.53 | 4.03 | 3.45 | 3.88 | 3.19 | 4.20 | 1.30 |
| Average | 0.28 | 0.16 | 0.14 | 0.06 | 0.79 | 1.27 | 0.36 | 0.77 |

Working Example 3

Table 5 provides details of a sensory experiment conducted to understand the effect of vanillic acid added to coffee made in an ADC brewer. Starbucks House Blend is brewed with an eight (8) cup Mr. Coffee ADC brewer with a drop weight of 29.5 grams of roast and ground coffee in 1420 mL water. Five (5) different coffee samples were prepared, including: (1) brewed coffee without vanillic acid added thereto, (2) brewed black coffee with 100 microgram/gram (µg/g) of vanillic acid added thereinafter, (3) brewed black coffee with 20 (µg/g) of vanillic acid thereinafter, (4) brewed black coffee with 10 (µg/g) of vanillic acid thereinafter, and (5) brewed black coffee with 1 (µg/g) of vanillic acid thereinafter. Sensory results are summarized from five panelists providing feedback on the impact of vanillic acid when added to brewed coffee.

TABLE 5

| Coffee | Brewed Coffee Feedback | Brewed Coffee with 100 µg/g vanillic acid | Brewed Coffee with 20 µg/g vanillic acid | Brewed Coffee with 10 µg/g vanillic acid | Brewed Coffee with 1 µg/g vanillic acid |
|---|---|---|---|---|---|
| Starbucks House Blend | Bitter, ashy, smoky, bitter and burnt | Better overall mouthfeel and smoothness, less bitter ness; slightly sweet flavor and higher body | Cold brew like, much less coffee bitterness | Softer, smoother, softening after taste, reduced roasted related overall flavor | Slightly less bitter, less upfront ashy |

Based on the panelists feedback, when vanillic acid is added to brewed coffee it reduces the bitterness in coffee and provides a softer, smoother taste.

Working Example 4

Table 6 provides details of a sensory experiment conducted to understand the effect of vanillic acid added to a variety of different coffee products, including: (1) Dunkin Dark brewed coffee brewed, (2) Bustelo Cool Ready-to-Drink, (3) Starbucks Pike Place brewed coffee, and (4) Folgers Classic Instant coffee. Brewed coffee is brewed with an eight (8) cup Mr. Coffee ADC brewer with a drop weight of 29.5 grams of roast and ground coffee in 1420 mL water. Instant coffee is made with standard instant coffee instructions. Four (4) different coffee samples were prepared, including: (1) coffee product without vanillic acid added thereto, (2) coffee product with 20 (µg/g) of vanillic acid added thereto, (3) coffee product with 10 (µg/g) of vanillic acid added thereto, and (4) coffee product with 1 (µg/g) of vanillic acid added thereto. Sensory results are summarized from panelists providing feedback on the impact of vanillic acid when added to the coffee products.

TABLE 6

| Experiment | Coffee | Description | 20 µg/g vanillic acid | 10 µg/g vanillic acid | 1 µg/g vanillic acid |
|---|---|---|---|---|---|
| 1 | Dunkin Dark | Ashy, sharp, normal sour | Cold brew like, but weaker strength, less bitter and less sour | Very noticeable change, less bitter, less coffee | More sweet, smoother, bitter; noticeable slight sweet compared to reference |
| 2 | Bustelo Cool | Burnt, cooked milk, nutty, chocolate flavor, sweet, creamy | clean flavor, good blended flavor, good sweetness, less cooked milk flavor, diminish coffee a little, definitely more creamy and vanilla flavor | More smoothness and less bitterness, thinner mouthfeel | Less bitterness |
| 3 | Starbucks Pike Place | Extreme bitter, burnt, rubbery | Slightly sweet, sour, cold brew like, very low rubbery, refreshing | Cold brew like, lower rubber, more creamy | Less bitter, less burnt, lower coffee notes |
| 4 | Folgers Classic Instant | Typical molasses taste | Less molasses and less strength, more sweet | More coffee aftertaste, less instant flavor | Slightly sweeter |

Based on the panelists feedback, when vanillic acid is added to brewed coffee it reduces the bitterness in coffee and provides a softer, smoother taste. The invention is capable of enhancing the flavor of RTD coffee beverages that may contain sweetener, creamer (dairy or non-dairy) and/or flavor (natural or artificial). RTD coffee beverages (Bustelo Cool) spiked with vanillic acid were smoother and had a better blended and creamy flavor, with less bitterness and cooked milk flavor.

The present disclosure has been described with reference to exemplary embodiments, it will be understood that it is not intended that the present invention be limited solely to such embodiments. Obviously, modifications and alterations will occur to others upon reading and understanding the preceding detailed description. In some embodiments of the invention, certain features of the invention can sometimes be used to advantage without a corresponding use of the other features. It is intended that the present disclosure be construed as including all such modifications and alterations insofar as they come within the scope of the appended claims or the equivalents thereof.

What is claimed is:

1. A liquid coffee composition comprising:
   water;
   coffee solids; and
   vanillic acid, wherein the vanillic acid concentration in the liquid coffee composition is in the range of about 0.5 ppm to about 12,000 ppm, and wherein the coffee composition does not have a perceptible non-coffee flavor.

2. The coffee composition of claim 1, wherein the coffee composition is selected from the group of consisting of brewed regular coffee, brewed decaffeinated coffee, decaffeinated liquid coffee concentrate, regular liquid coffee extract, or any combination of one or more thereof.

3. The coffee composition of claim 1, wherein the ratio of the vanillic acid in the coffee composition compared to a similar coffee composition prepared in the same manner without the addition of vanillic acid solid is at least 50:1.

4. The coffee composition of claim 1, wherein the liquid coffee composition provides a reduced perception of bitterness when compared to a similar coffee composition prepared without the addition of vanillic acid.

5. A method of reducing the perceptible bitterness in a coffee product comprising:
providing a coffee product; and
adding vanillic acid to the coffee product, wherein the coffee composition does not have a perceptible non-coffee flavor.

6. The method of claim 5, wherein the coffee product is selected from the group of consisting of: brewed coffee, green coffee, regular coffee, ground roast coffee, roast coffee, ground coffee, liquid coffee, decaffeinated coffee, liquid coffee concentrate, coffee extract, instant coffee, or any combination of one or more thereof.

7. The method of claim 5, wherein the coffee product is ground roast coffee, and at least a portion of the ground roast coffee comprises predried green coffee that has been roasted and then ground.

8. The method of claim 5, wherein the step of adding vanillic acid to the coffee product increases the amount of vanillic acid by at least a factor of 50.

9. The method of claim 5, wherein the vanillic acid is extracted from a coffee product, coffee waste product, coffee cherries, coffee leaves, or any combinations thereof.

10. The method of claim 5, further comprising the step of roasting the coffee product and wherein the vanillic acid is added to the coffee product as part of the quench water after roasting the coffee product.

11. The method of claim 5, where the amount of vanillic acid is greater on a weight basis than any added vanillin.

12. A method of reducing the perceptible bitterness in a coffee product comprising:
providing a green coffee bean;
adding at least one vanillic acid precursor to the green coffee bean; and
roasting the green coffee bean and the at least one vanillic acid precursor, wherein the vanillic acid precursor is added as part of a coffee extract added to the coffee product.

13. The method of claim 12, wherein the at least one vanillic acid precursor is selected from a chlorogenic acid, ferulic acid, quinic acid, or any combination of one or more thereof.

14. A solid coffee composition comprising:
a solid coffee product; and
vanillic acid, wherein the amount of vanillic acid in the solid coffee composition is in the range of about 0.5 ppm to about 20,000 ppm, wherein the coffee composition does not have a perceptible non-coffee flavor.

15. The solid coffee composition of claim 14 wherein the solid coffee product is selected from the group of consisting of coffee beans, coffee grounds, spray dried powder instant coffee, agglomerated instant coffee, freeze dried instant coffee, vacuum dried instant coffee, or any combination of one or more thereof.

16. The solid coffee composition of claim 14, wherein the ratio of the vanillic acid in the dry coffee composition compared to a similar coffee composition prepared without the addition of vanillic acid is at least 50:1.

17. The solid coffee composition of claim 14, wherein the solid coffee product has a surface and the vanillic acid is applied as a coating that coats at least a portion of the surface of the solid coffee product.

18. The solid coffee composition of claim 14, wherein the solid coffee product has a surface and a matrix of the vanillic acid and coffee extracts from the solid coffee product is on at least a portion of the surface of the solid coffee product.

19. A liquid coffee composition comprising:
water;
coffee solids; and
vanillic acid, wherein the vanillic acid concentration in the liquid coffee composition is in the range of about 0.5 ppm to about 12,000 ppm, and wherein the coffee composition does not have a perceptible taste of vanilla.

* * * * *